United States Patent
Chiu

(10) Patent No.: US 8,536,841 B2
(45) Date of Patent: Sep. 17, 2013

(54) PWM CONTROL CIRCUIT OF A CONVERTER AND THE CONTROL METHOD THEREOF

(76) Inventor: Yueh Mei Chiu, Taipei (TW)

( * ) Notice: Subject to any disclaimer, the term of this patent is extended or adjusted under 35 U.S.C. 154(b) by 277 days.

(21) Appl. No.: 13/219,687

(22) Filed: Aug. 28, 2011

(65) Prior Publication Data

US 2013/0049714 A1    Feb. 28, 2013

(51) Int. Cl.
*G05F 1/00* (2006.01)

(52) U.S. Cl.
USPC ............ 323/271; 323/282; 323/284; 323/285

(58) Field of Classification Search
USPC .......................... 323/271, 282, 283, 284, 285
See application file for complete search history.

(56) References Cited

U.S. PATENT DOCUMENTS

2010/0013450 A1* 1/2010 Huang et al. .................. 323/282
2012/0319662 A1* 12/2012 Kung ............................ 323/271

* cited by examiner

*Primary Examiner* — Nguyen Tran
*Assistant Examiner* — Afework Demisse

(57) ABSTRACT

A PWM control circuit of a power converter includes an upper-bridge element Q1, connected to a lower-bridge element Q2 by a node, which activates by a driver Q1 and Q2 for switching-on and switching-off; the driver is controlled by a PWM signal. The node further connects to an output inductor and an output capacitor and controls the current of the output inductor to charge the output capacitor to produce an output voltage VOUT. A virtual ripple current PWM circuit includes a DC reference voltage level unit, an integrator-plus-DC bias voltage eliminator, a phase synthesizer, a dual reference voltage level generator, and a PWM generator.

10 Claims, 13 Drawing Sheets

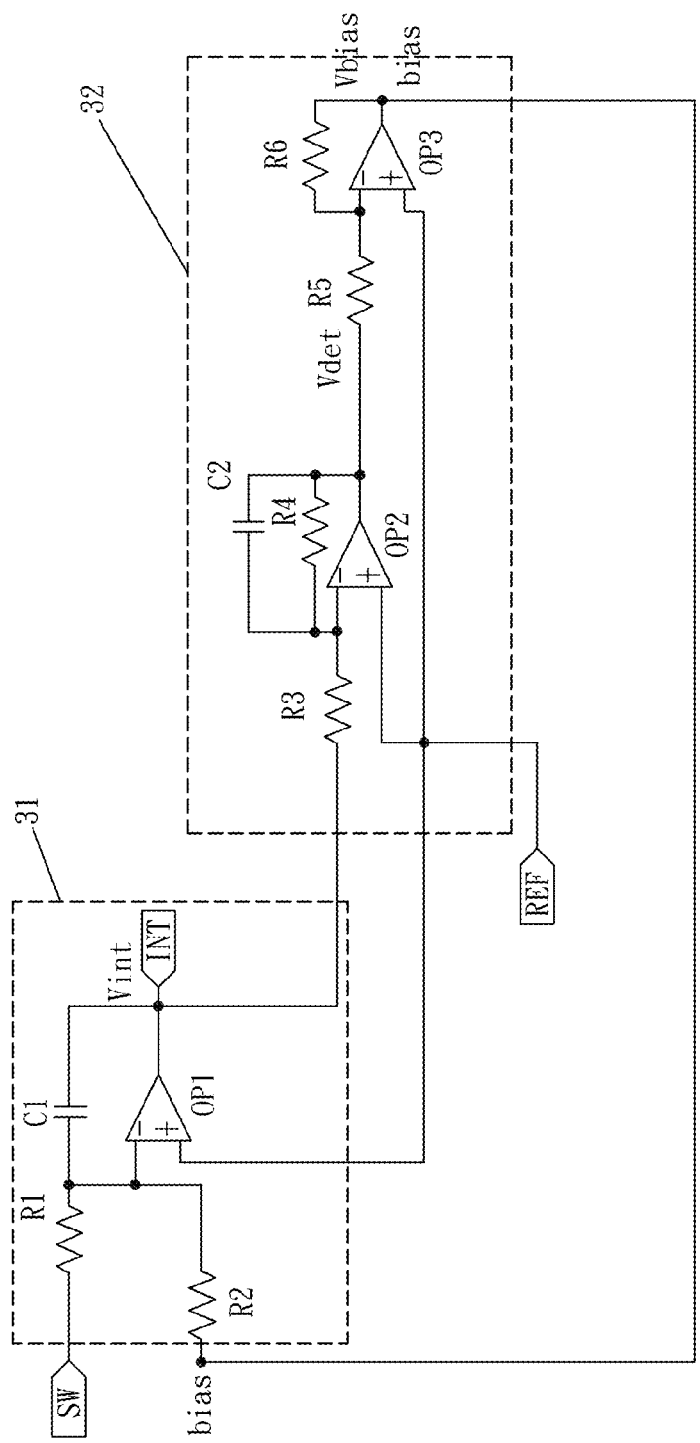
F I G . 5

PWM CONTROL CIRCUIT OF A CONVERTER AND THE CONTROL METHOD THEREOF

I. FILED OF INVENTION

The invention is related to a pulse-width modulation (PWM) control circuit of a converter and the control method thereof; in particular, it relates to a PWM control circuit and the method thereof which maintain a stable modulation of a converter dispensing with a closed-loop circuit.

II. DESCRIPTION OF PRIOR ART

Power converters play an important role in general electronic equipments by providing voltages for electronic equipments to function. A big concern for consumers is whether an electronic equipment is able to be active in function for a long period of time without problems. Accordingly, the main object in designing power converters is to maintain the converters to functionally active in long-term use.

The main products in power converters focus on switching power supplies, which output an accurately controlled voltage for a given load based upon the output power, voltage or current by PWM (Pulse-width modulation), avoiding unnecessary energy loss and hence saving energy.

Referring to U.S. Pat. No. 6,433,525, disclosed by Intersil, a converter of switching power supplies, making use of a circuit to detect changes of polarities in the current by detecting the inductance and the current. Also included is a counter for recording the timing when the load current starts to change; different modes for output power is accordingly adjusted, based on the recording of the counter. When the switching power supply is in a status of a heavy current load, a PWM is used to control the output energy; whereas in light current load, a Hysteresis Ripple control circuit is used to control the output, accordingly prolonging the activeness of electronic equipments by saving output energy.

Nevertheless, for converters of switching power supplies, there always exists a lagging in time from the moment the counter is sensing the changes of load currents to the moment an appropriate output mode is decided by the system, making converts unable to provide momentarily adequate energy based on the real-time actual current load. For instance, due to the lagging error of the counter, even if the load has changed from a high current to a low current, the output may still be in the mode of the Hysteresis Ripple circuit, and therefore, the output energy is inadequate for the current load. In sum, there is still room for improvement in applying switching power supplies to save output energy.

Furthermore, a compensation-by-adjustment must be made for the input load current in order to maintain a stable output energy, requiring a Hysteresis Ripple circuit or other circuits, which would take up more physical space in addition to increasing manufacturing cost.

SUMMARY OF THE INVENTION

It is therefore the purpose of the invention to provide a cost-effective compact PWM control circuit which generates a PWM signal reducing the effects from characteristics of an output inductor and an capacitor in order to better control the output energy.

The circuit of a converter of the instant application includes one or more upper-bridge element connected to one or more lower-bridge element nodes. An input voltage is electrically connected with the upper-bridge element and the lower-bridge element. The node is activated by a driver to make the upper-bridge element and the lower-bridge element to switch "ON" and "OFF". The node is also connected with an output inductor and output capacitor, and controls the current of the output inductor to charge the output capacitor to produce an output voltage. The PWM control circuit includes a virtual ripple current PWM circuit, which further includes a DC reference voltage level unit, an integrator-plus-DC bias voltage eliminator, a phase synthesizer, a dual reference voltage level generator, and a PWM generator.

The input of the integrator-plus-DC bias voltage eliminator connects to the voltage at the node and also connects to an output voltage response, generating a virtual ripple current signal parameter at a DC reference voltage level. The square waveform of the voltage at the node is integrated by the integrator-plus-DC bias voltage eliminator into a triangular waveform at a DC reference voltage level, with the slope of the triangular waveform corresponding to changes of voltages at the node.

The integrated waveform of voltage at node A (output from the integrator-plus-DC Bias eliminator) is input to the phase synthesizer and synthesized by proportional superimposition with the output voltage (of the converter) to become a semi-triangular PWM signal parameter. The input of the dual reference voltage level generator connects to the DC reference voltage level unit, while the output of the dual reference voltage level generator connects to the PWM generator. The input of the PWM generator connects to the output of both the dual reference voltage level generator and the phase synthesizer.

Corresponding to the positive and negative reference voltage level, the dual reference voltage level generator generates, respectively, an upper and a lower DC reference voltage level, to which the PWM signal parameter is compared to produce a PWM signal to input to the driver. The integrator-plus-DC Bias eliminator connects to the dual reference voltage level generator, and the input of connects to the node of a voltage; the square waveform of the voltage at the node is input to the integrator-plus-DC Bias eliminator and is output as a triangular waveform at the DC reference voltage level unit, with the slopes of the triangular waveform correspond to changes of voltages at the node.

Again, the integrated voltage waveform (output from the integrator-plus-DC Bias eliminator) is input to the phase synthesizer and superimposed in proportion with the output voltage of the converter to become a semi-triangular waveform, functioning as a PWM signal parameter. Both the output of the phase synthesizer and the output of the dual reference voltage level generator connect to the input of the PWM generator. A PWM signal is generated by the phase synthesizer, by comparing the PWM signal parameter and the upper and lower DC reference voltage, and input to the driver to control the upper-bridge and the lower-bridge element.

The instant invention makes use of a virtual ripple current PWM circuit for power switching, dispensing with complicated control in characteristics of output inductance or capacitance, and in saving extra circuits for adjusting frequency response of error amplifiers. The goal is to provide a user-friendly converter with a high stability in application. Whether in heavy or light load, the virtual ripple current PWM circuit disclosed for a converter is not only cost-effective but also of a substantially reduced physical volume.

The PWM control method disclosed in the invention uses a stable compensation—by—adjustment approach, including the following steps:

a. setting up a DC reference voltage level, the square waveform of the voltage at the node being integrated at the integrator-plus-DC Bias eliminator becomes a virtual ripple current signal parameter at the DC reference voltage level;

b. the virtual ripple current signal parameter being superimposed or synthesized with the output voltage response to become a semi-triangular PWM signal parameter; and c. monitoring the PWM signal parameter for generating a PWM signal to control the upperbridge and the lower-bridge element;

Among which, step c) further includes setting up an upper and a lower voltage reference level, corresponding to the positive and the negative voltage reference level, respectively. When rising and dipping in waveform of the PWM signal parameter is located at the upper and the lower voltage reference level, respectively, a PWM signal is generated.

DETAILED DESCRIPTION OF DRAWINGS

Please refer to FIG. 1, which illustrates the circuit of the converter of the instant application. The converter includes an upper-bridge element Q1, and a lower-bridge element Q2; The input voltage VIN is electrically connected with Q1, while Q1 and Q2 are connected by a phase node A, which is activated by the driver 91 to make Q1 and Q2 to switch between "ON" and "OFF". Alternatively, Q2 can be a diode (not shown in FIG. 1). Node A is also connected with an output inductor 92 and output capacitor 93, and controls the current of the output inductor 92 to charge the output capacitor 93 to produce an output voltage VOUT. The Voltage divider 94 and 95 detects changes of the output voltage VOUT. The voltage at node A as well as the output voltage response VOUT are input to the virtual ripple current PWM circuit 1 in FIG. 1, which makes an output to the driver 91 to control both Q1 and Q2 for switching on/off.

Referring to FIGS. 1 to 4, a virtual ripple current PWM circuit 1 includes a DC reference voltage level unit 2, an integrator-plus-DC bias voltage eliminator 3, a phase synthesizer 4, a dual reference voltage level generator 5, and a PWM generator 6; among which, the DC reference voltage level unit 2 provides a reference DC voltage level VREF (shown in FIG. 4), and is connected to an integrator-plus-DC Bias eliminator 3. The integrator-plus-DC Bias eliminator 3 includes an integrator 31 and a DC Bias eliminator 32; an input end of the integral-plus-DC Bias eliminator 3 is connected with a VSW voltage signal of node A.

Referring to FIGS. 3 and 4, a square waveform of node A is input to the integrator-plus-DC Bias eliminator 3, which then is output to be a triangular waveform Vint (shown in FIG. 4) at DC reference voltage level; the slope of the triangular waveform corresponds to changes of voltages at node A. FIG. 4 shows a triangular waveform Vint to be out-of-phase; alternatively, Vint can also be in phase.

The output of the integrated waveform from the integrator-plus-DC Bias eliminator 3 is input to the phase synthesizer, superimposed proportionally with a feedback voltage VFB of the converter, and becomes a triangular waveform VEA for being a PWM signal parameter. The triangular waveform VEA shown in FIG. 4 is an Vint after phase-inversion to correspond to the in-phase VSM waveform.

The input end of the dual reference voltage level generator 5 connects to the DC reference voltage level unit 2, and the output end of the dual reference voltage level generator 5 connects to a PWM generator 6. The PWM generator 6 generates a positive voltage VERF+ and a negative voltage VERF−, both of the same voltage amount corresponding to the reference DC voltage level VREF.

The input end of the PWM generator 6 connects to an output end of the phase synthesizer 4 and an output end of the dual reference voltage level generator 5. A PWM signal is generated by comparing the parameter signal VEA (input to the phase synthesizer 4) as well as both the positive voltage VERF+ and a negative voltage VERF− (generated by the dual reference voltage level generator 5) and input to the driver 91 to control both the upper-bridge element Q1 and the lower-bridge element Q2.

Referring to FIG. 4, at time T1 the feedback voltage VFB (output by the converter) drops, the upper-bridge element Q1 is conducted, and the voltage of VSW rises for VSW of the node A at a voltage VIN. At Time T2, the output voltage VOUT rises, the lower-bridge element Q2 is conducted, and the value of VSW drops for the node A to be at ground level. In the meantime, the internal resistance (not shown in figures) characteristic of the output capacitor 93 is charged by the output inductor 92; ripples of the feedback voltage VFB are of different peak values, corresponding to the characteristic of the output capacitor 93; the integrator-plus-DC Bias eliminator 3 outputs a voltage Vint, and a triangular waveform of reference voltage level VREF is generated corresponding to VSW reference DC voltage level VREF. The triangular waveform shown in the instant application is anti-phase with VSW; alternatively, The triangular waveform can also be in phase with VSW.

The feedback voltage VFB (output by the converter) is an input to the phase synthesizer 4, superimposed by Vint converted in phase, functions as a reference voltage parameter in PWM. Since VEA is produced by having Vint being converted in phase, an in-phase waveform is generated corresponding to VSW. The positive voltage VERF+ and the negative voltage VERF− represents, respectively, the positive and the negative level of the reference voltage level VREF. Also, the slopes of VEA waveforms of the instant application correspond to changes in voltage of VFB to generate a semi-triangular wave. Accordingly, when VEA drops and meets with VREF− at voltage B at time T1, or when VEA rises and meets with VREF+ at voltage C at time T2, a PWM signal is generated by the PWM generator 6 to control the driver 91 and make both the upper-bridge element Q1 and the lower bridge element Q2 work accordingly. As a result, an improvement is made to stabilize the output voltage by accurately controlling changes in output voltages.

The design of different parts of the instant application, including an integral-plus-DC Bias eliminator 3, a phase synthesizer 4, a dual reference voltage level generator 5, and a PWM generator 6, is meant to realize the above-mentioned functions. Referring to FIG. 1-5, a integral-plus-DC Bias eliminator 3 includes an integrator 31 and a DC Bias eliminator 32; the integrator 31 further includes an operational amplifiers OP1, with the negative input end connects to a $1^{st}$ resistor R1, which in turn connects to signal SW of node A, and with the positive input connects to a $2^{nd}$ resistor R2, which in turn connects to the bias output from the DC Bias eliminator 32. The output of OP1 connects to the negative input end thereof by a capacitor C1; the parameter of time for integrating by integrator 31 is determined by R1 and C1. The positive of the integrator 31 connects to the output REF of DC reference voltage level unit 2, generating a triangular wave signal by integrating a square voltage wave VSW at node A. Bias voltage is used to modulate the DC output level. The DC Bias eliminator 32 further includes an integral circuit and an error amplifier; the input of the integral circuit connects to the output of the integrator 31, while the error amplifier connects to the output of integral circuit, as well as to the output node REF of the DC reference voltage level unit 2. As a result, a triangular wave of a different DC level is generated by integrator 31, corresponding to the VSW signal at node A (as shown in FIG. 3). A corresponding DC waveform is generated by the integrator, which is then compared with VREF of the DC reference voltage level unit 2 by OP1 for errors between the two. The value of errors is amplified before inputting to the integrator 31. The integrator thus outputs a triangular wave of different DC levels for modulation to the triangular wave Vint of DC reference voltage level.

The DC Bias eliminator 32 further includes a $2^{nd}$ operational amplifier OP2, a $3^{rd}$ operational amplifier OP3, a $3^{rd}$ resistor R3, a $4^{th}$ resistor R4, a $5^{th}$ resistor R5, a $6^{th}$ resistor R6, and a $2^{nd}$ capacitor C2. The negative input of OP2 connects to the output of OP1 by R3; also, in between the negative input and the output of OP2 is connected in parallel to R4 and C2. The positive input of OP2 connects to the output node REF of the DC reference voltage level unit 2 for OP2 being an integral circuit. The negative input of OP3 connects to the output of OP2 by R5; the negative input of OP3 connects to the output thereof by R6. The positive input of OP3 connects to the output node REF of the DC reference voltage level unit 2

Referring to FIGS. 5 and 5-1, when there is no DC errors, Vint outputs a VCR triangular wave (internal resistance voltage of output capacitor 93), i.e. VSW after integrating, superimposed with VREF level. While DC errors can be eliminator by inverting integration of OP2 when a triangular wave signal of OP2 input to the integrator 31, and a corresponding DC signal Vdet is output. DC waveforms output from OP2 is input to OP3 and compared to the reference voltage level for errors. Errors become Vbias after being amplified, which is then fed back to the negative input of OP1 of the integrator 31. As a result, a triangular wave VCR integrated from VSW and superimposed by VREF to become a virtual ripple triangular wave Vint, corresponding to a DC reference voltage level, is output by the integrator-plus-DC Bias eliminator 3.

Referring to FIG. 1-6 for a second preferred embodiment of the instant application; the integrator 31 is the same that shown in FIG. 5. A DC bias eliminator 33 is comprised of a comparator circuit, and an inverting integrator circuit. The comparator circuit further includes a $4^{th}$ operational amplifier OP4. The negative input of OP4 connects to the output of the integrator 31; the positive input of OP4 connects to the output node REF of the DC reference voltage level unit 2. The inverting integrator circuit includes a $7^{th}$ resistor R7, a $3^{rd}$ capacitor C3, and a $5^{th}$ operational amplifier OP5. The negative input of OP5 connects to the output of OP4 (of the comparator circuit) by R7; the negative input of OP5 connects to the output of OP5 by C3. The positive input of OP5 connects to the output node REF of the DC reference voltage level unit 2. As a result, when there is no DC errors, Vint outputs VCR (i.e. VSM after integration) superimposed with the voltage level of VREF, as shown in FIGS. 6, 6-1, and 6-2. When there is DC errors, the integral waveform received by the integrator 31 is compared to the DS reference voltage level VERF by a comparator, and the difference after comparison is shown as a square wave within the dotted line in FIG. 6-1. If the RMS (root mean square) value is the same as that of DC reference voltage level VERF, the duty ratio would be 50%; the output of the comparator circuit Vcomp is two times DC reference voltage level, whereas K is equal to 2. DC current errors Vbias generated in reference to Vint after being integrated by the integer 31, are shown in FIGS. 5 and 6-2. Vbias can be input to the bias node of the integrator 31. The phase can offset DC errors in reference to Vint to modulate the output DC of the integrator 31, resulting in a triangular wave signal Vint, in reference to the DC reference voltage level.

Referring to FIGS. 1-4, and 7, the phase synthesizer 4 includes an error amplifier. The input of phase synthesizer 4 receives Vint (output from integral-plus-DC Bias eliminator 3), as well as VFB (feedback voltage output from the converter), superimposed in synthesis to output a PWM reference signal. In a preferred embodiment, the negative input of a $6^{th}$ operational amplifier OP6 connects to Vint (i.e. the output of integral-plus-DC Bias eliminator 3) by a $8^{th}$ resisitor R8. The negative input of OP6 connects also to the output thereof by a resistor R9. A node connects between R8 and R9. The positive input of OP6 connects to FB, i.e. feedback voltage from the converter, modulating proportionally the resistance of R8 and R9 in consideration of the output voltage of the integrator-plus-DC Bias eliminator 3 as well as VFB. Preferably, Vint is set to be 1/20 of Vint, taking into consideration of VFB. The output voltage (of the integrator-plus-DC Bias eliminator 3) is superimposed with VFB, with the slope of the triangular waveform of the output voltage synthesizing by vector analysis with that of VFB to output a PWM reference signal VEA.

Referring to FIGS. 1-4 and 8, the dual reference voltage level generator 5 includes two comparator circuits; the input of each of the two comparator circuits connects a DC reference level signal; each of the two connectors connects to a resistor; an upper and a lower DC current reference level corresponding, respectively, to the positive and negative DC reference level is generated, based on the resistance of the resistor connected. In this preferred embodiment, an operational amplifier OP7 and an operational amplifier OP8. The positive input of OP7 and OP8 connect to the node REF (of the DC reference voltage level unit 2). The negative input of OP7 connects to R10 grounded, and also connects to the output thereof by a resistor R11; the output of OP7 generates a higher reference level VREF+. The negative input of OP8 connects to the output of OP7 by a resistor R12; also the negative input of OP8 connects to the output thereof by a resistor 13. A node connects to R12, R13 and the negative input of OP8. The output of OP8 generates a lower DC reference level VREF−. The higher DC reference level VREF+ is set to be VREF+(VREF*R11/R10); the lower DC reference level VREF− is set to be [(VREF+−VREF)*−1]+VREF. For instance, when the DC reference level VREF is 1V, the resistance of R10 is 99K, and resistance of R11 is 1K, the value of VREF+ is calculated as 1+(1*1K/99K), i.e. 1.01 V; the value of VREF− is calculated as [(1.01V−1V)*−1]+1V=0.99V 。

Referring to FIGS. 1-4 and 9, the PWM generator 6 of the instant application includes two comparator circuits, the input of one comparator circuit connects a PWM parameter signal EA and a higher DC reference level REF+, while the input of the other comparator circuit connects to PWM parameter signal EA and a lower DC reference level REF−. The two comparator circuits output a square waveform, in reaction to changes of slopes of the PWM parameter signal EA. The square waveform can be amplified by a flip-flop and a PWM signal can then be generated by a soft-start circuit. A preferred embodiment shown in FIG. 9 includes a $9^{th}$ operational amplifier OP9, a $10^{th}$ operational amplifier OP10, an RS flip-flop, and a soft-start circuit 61. The soft-start circuit 61 is a well known in the art of converters. The positive input of OP9 connects to the PWM parameter signal EA from the phase synthesizer 4.

The negative input of OP9 connects to the higher DC reference level REF+. The negative input of OP10 connects the PWM parameter signal EA from the phase synthesizer 4; the positive input of OP10 connects the lower DC reference level REF−. The output of OP9 and OP10 connects, respectively, to the R and S of an RS flip-flop; the Q of the RS flip-flop and the output of the soft-start circuit 61 connects to an AND gate; the AND gate generates a Pulse-Width Modulation signal PWM, making OP9 to output a high voltage square waveform when the slope of a VEA waveform rises to the level of VREF+ and output a low voltage from Q of the RS flip-flop to lower the output voltage of the converter. While the slope of the VEA waveform drops to the level of VREF−, OP10 outputs a high voltage square waveform to increase the output voltage of the converter.

Referring to FIG. 10, a preferred embodiment of the instant application includes two virtual current ripple PWM circuit 1, two drivers 91, and an upper-bridge element Q1 and a lower-bridge element Q2, parallelly connected, further connected to an output inductor 92 and an output capacitor 93. In actual application, more than two sets of PWM circuits can be parallelly connected, depending on the load.

The invention disclosed herein may very well be embodied in other specific forms without departing from the spirit or general characteristics thereof, the embodiments described herein are to be considered in all respects illustrative and not restrictive. The scope of the invention includes all changes which come within the meaning and range of equivalency of the claims.

BRIEF DESCRIPTION OF DRAWINGS

FIG. 5-1 shows the waveforms for the integrator-plus-DC bias eliminator in FIG. 5 in action.
FIG. 6-1 shows the waveforms for the integrator-plus-DC bias eliminator in FIG. 6.
FIG. 6-2 shows the waveforms for the integrator-plus-DC bias eliminator in FIG. 6.

Figure 1:
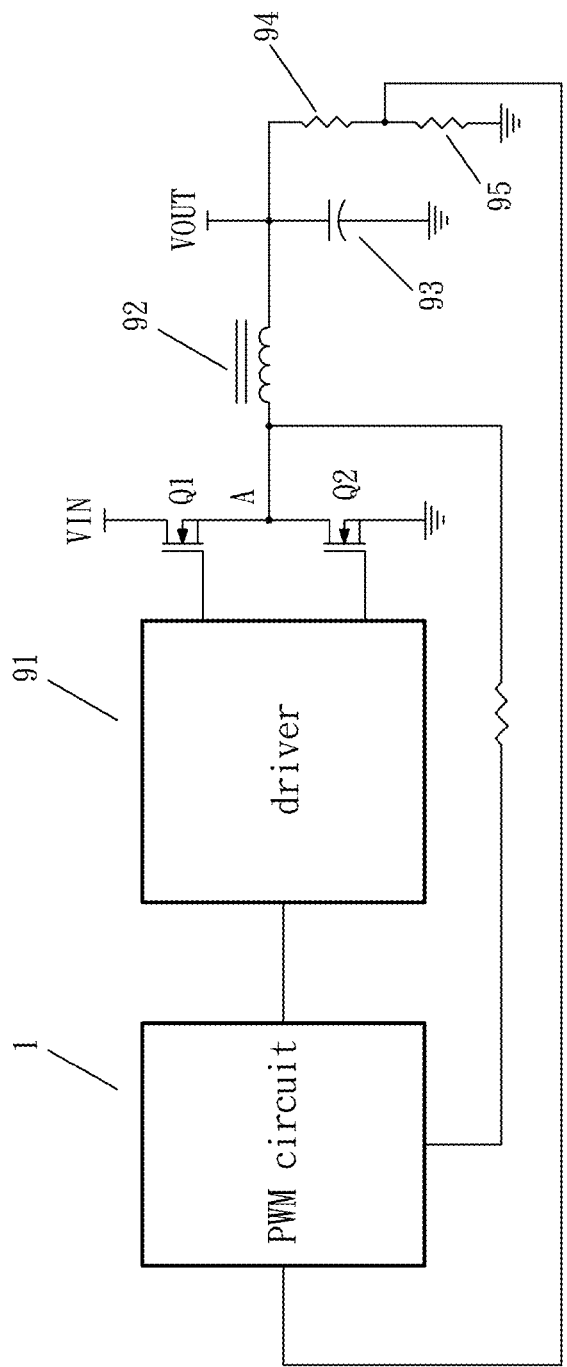
FIG. 1 shows the circuit of the invention.
Figure 2:
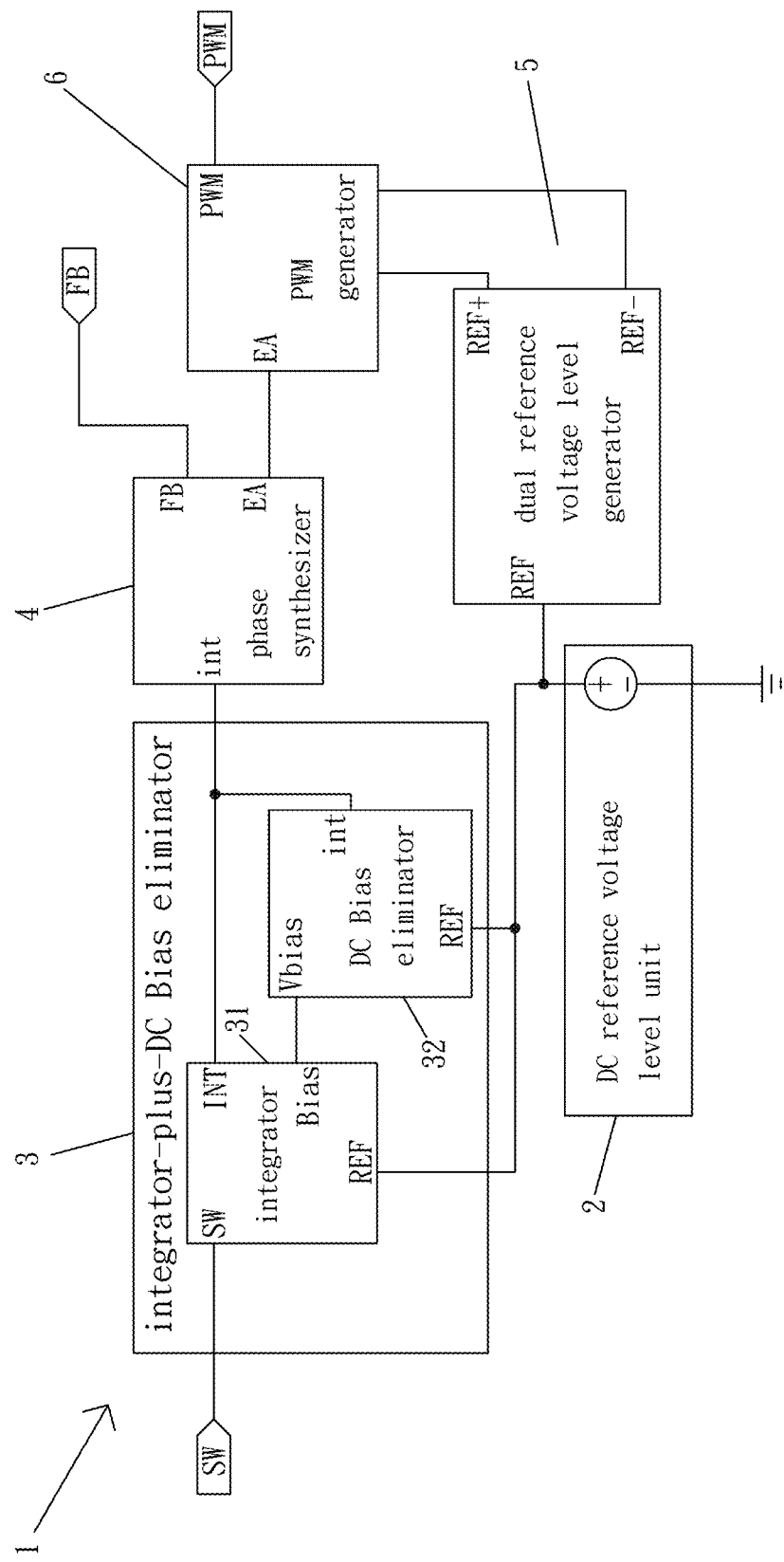
FIG. 2 shows the block diagram of the virtual ripple current PWM circuit
Figure 3:
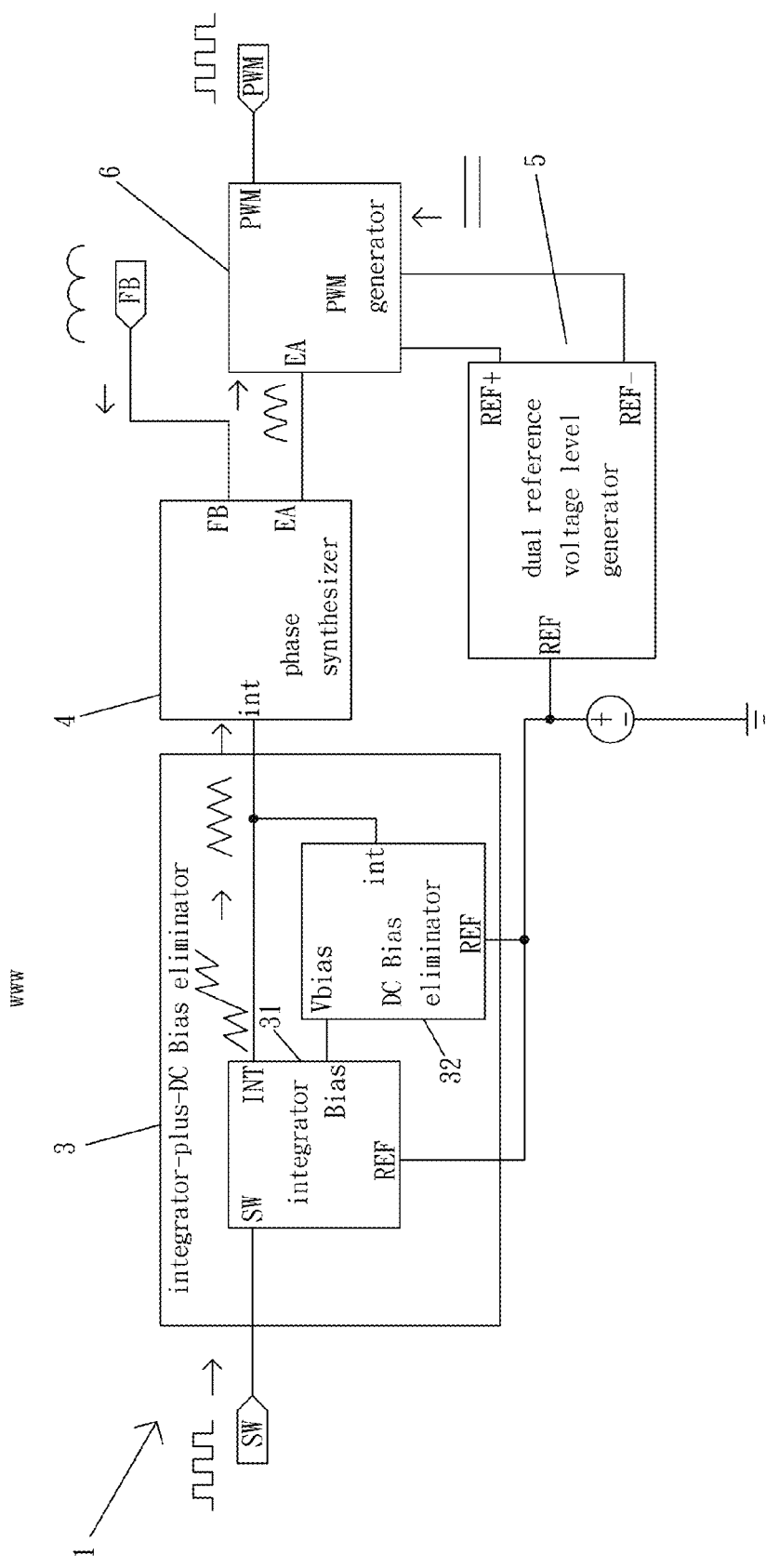
FIG. 3 shows the virtual ripple current PWM circuit and the waveforms generated while the converter is in action
Figure 4:
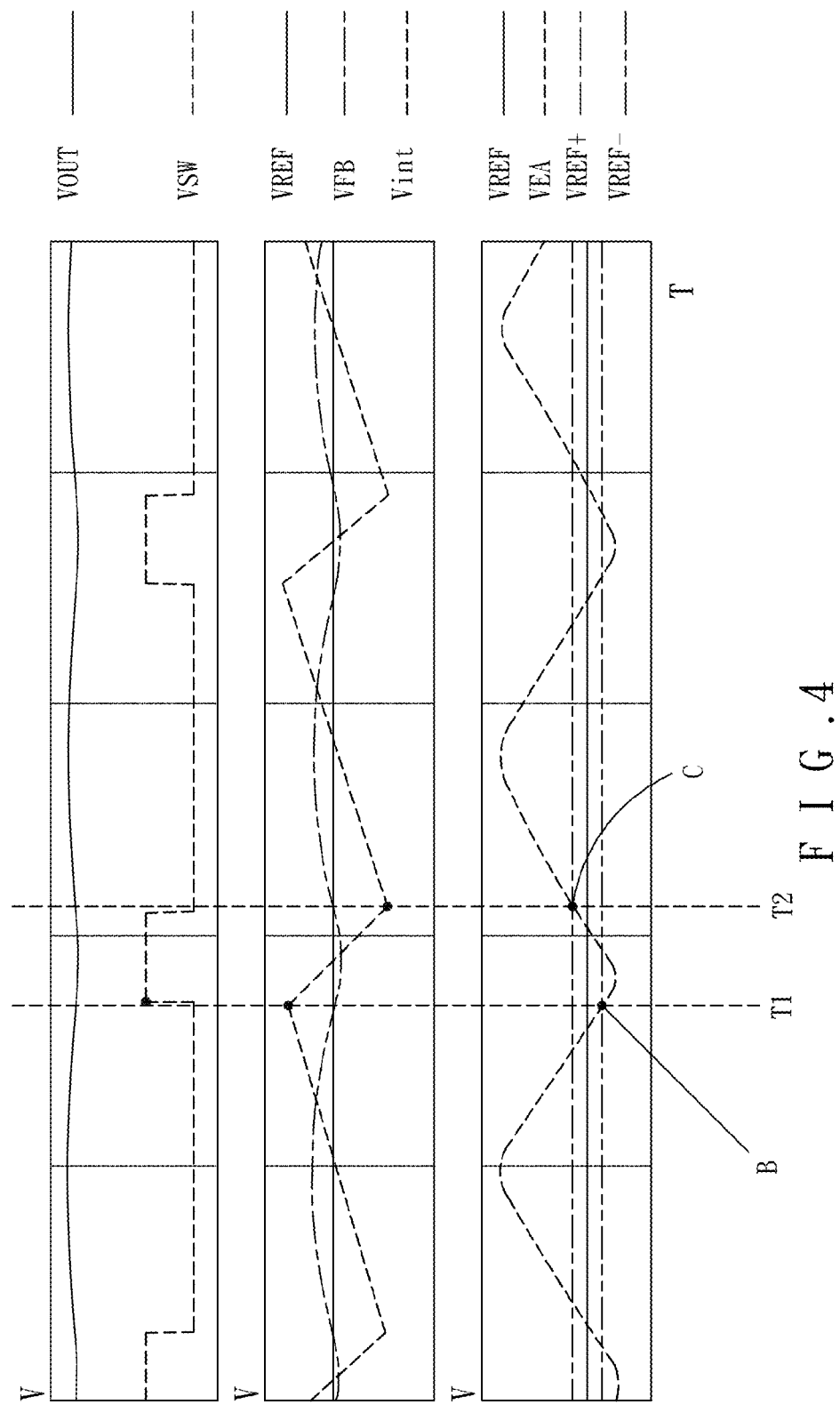
FIG. 4 shows the waveforms when the converter is in action.
Figures 1, 5:
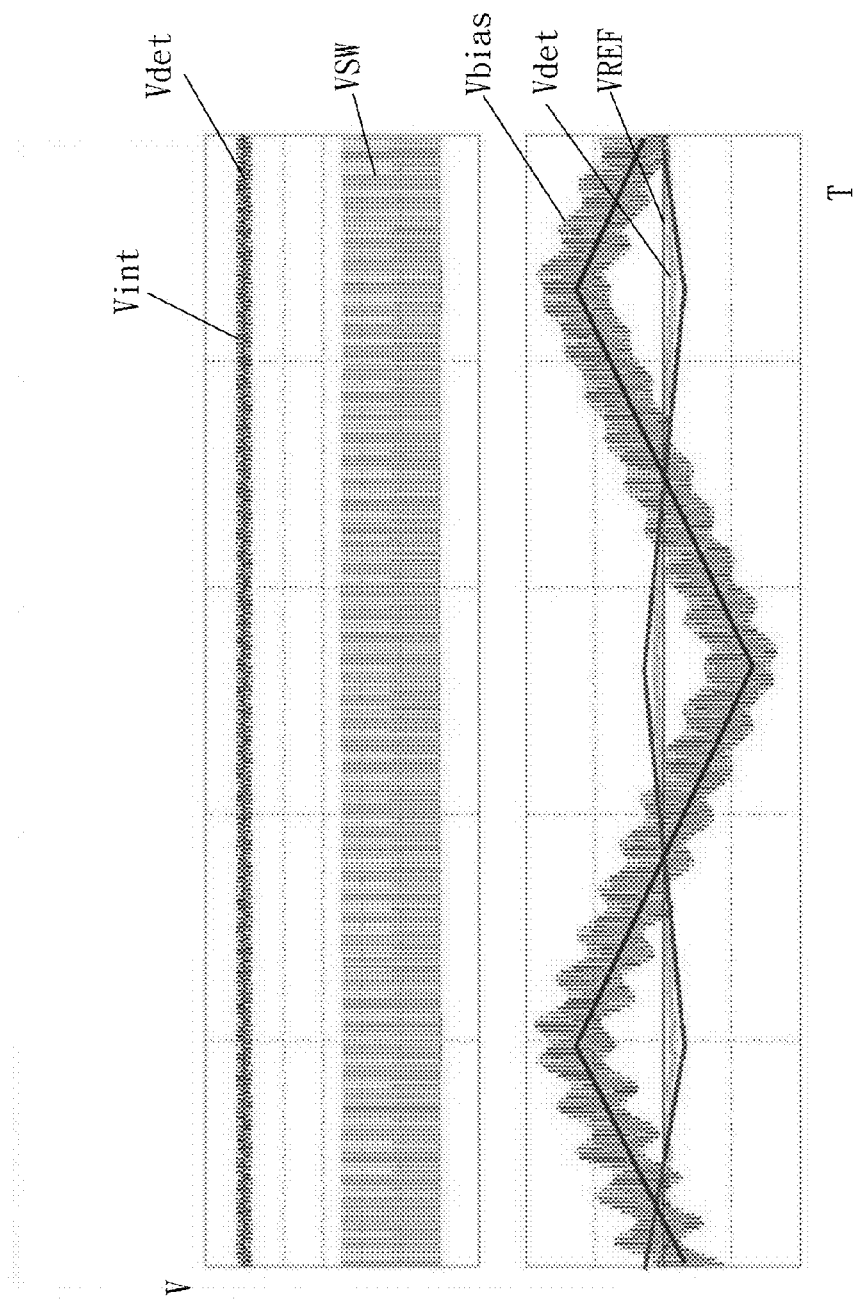
FIG. 5 shows the circuit for the integrator-plus-Dc bias eliminator.
Figure 6:
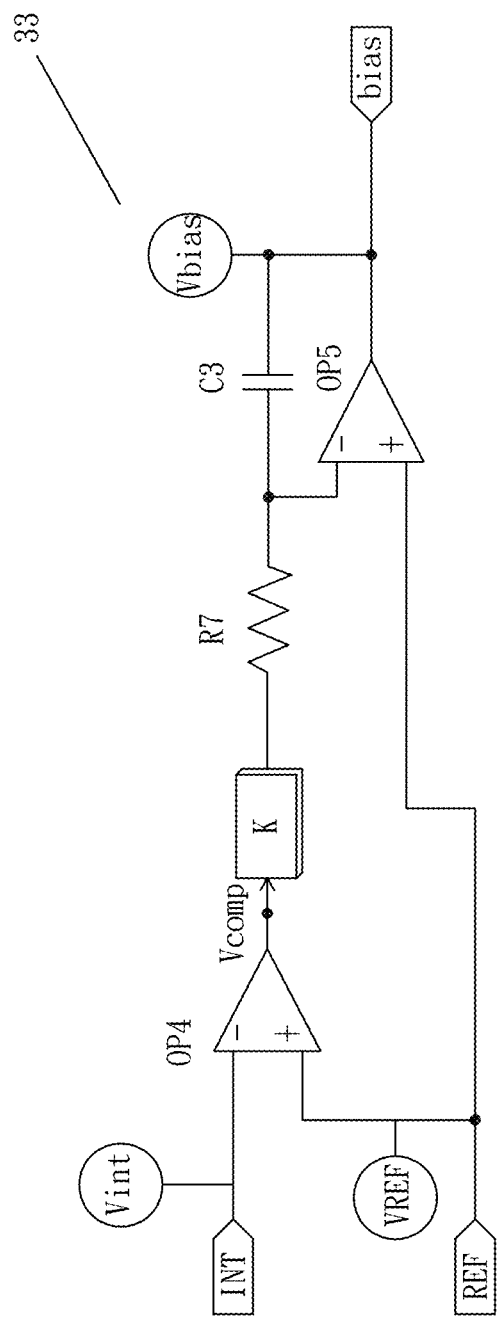
FIG. 6 shows another view of the circuit for the integrator-plus-Dc bias eliminator
Figures 1, 6:
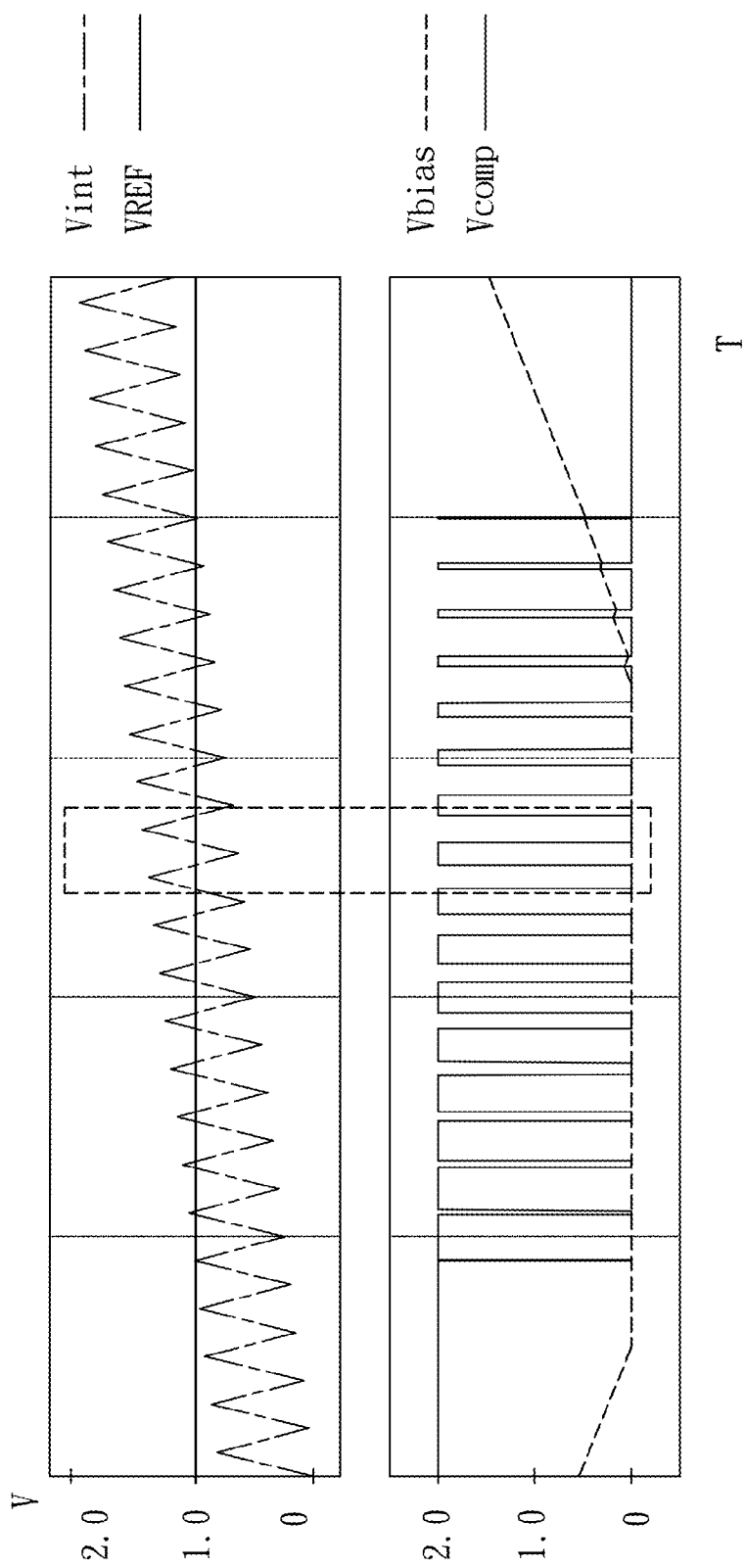
Figures 2, 6:
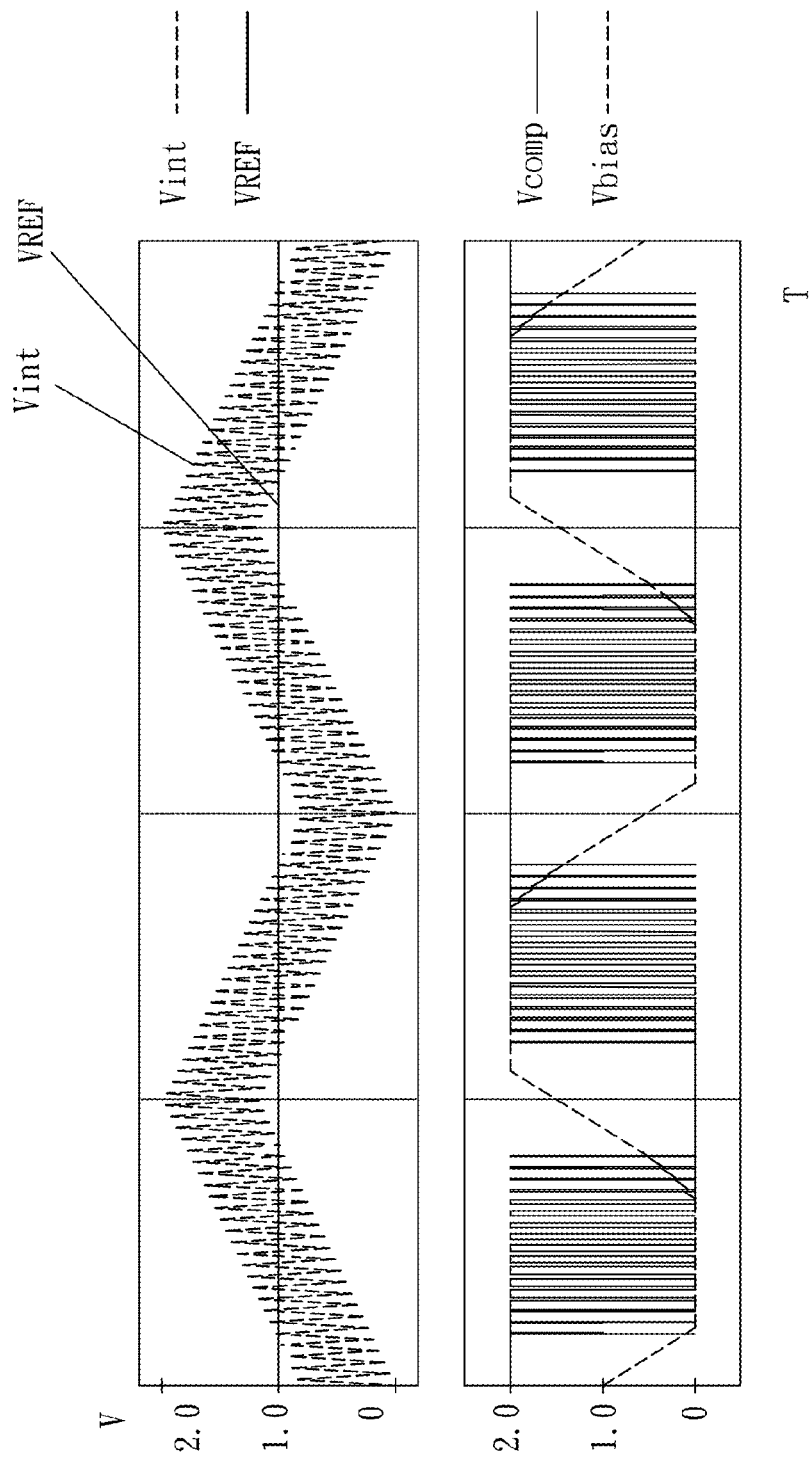
Figure 7:
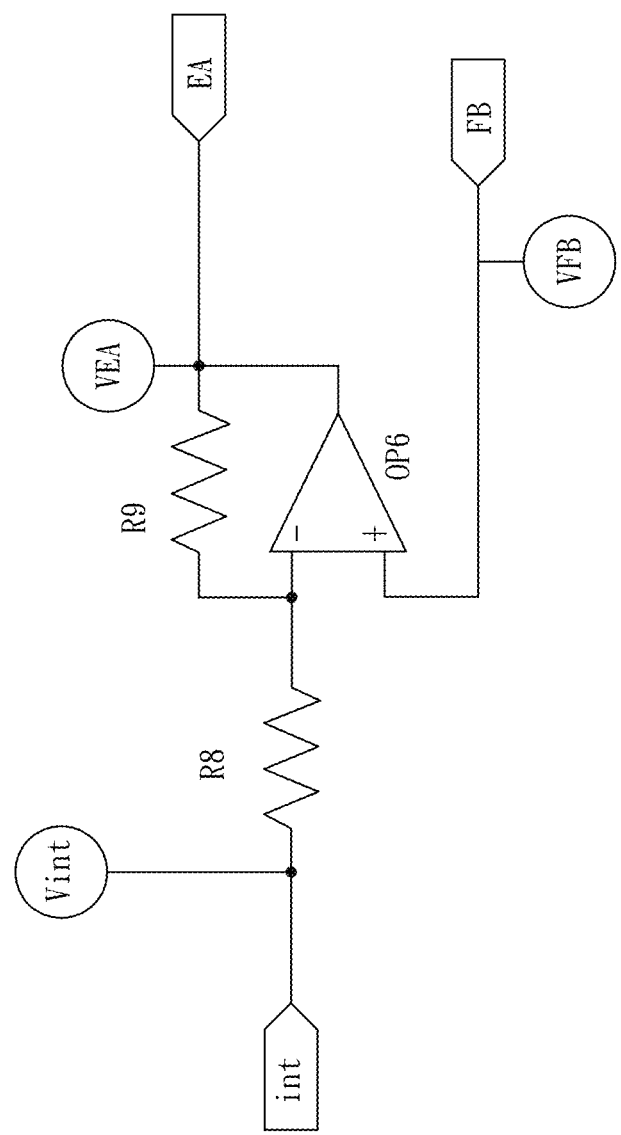
FIG. 7 shows the circuit for the phase synthesizer.
Figure 8:
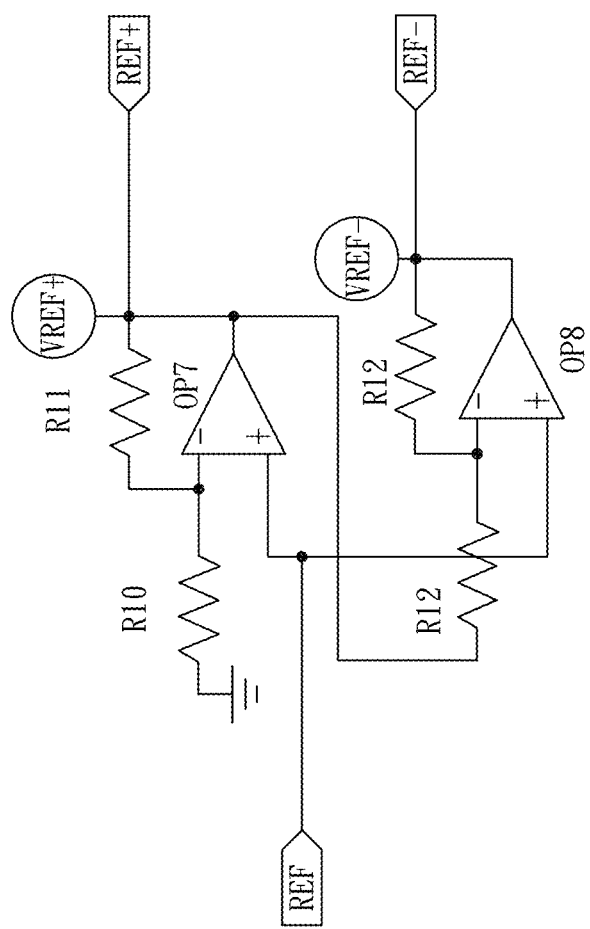
FIG. 8 shows the circuit for the dual reference voltage level generator.
Figure 9:
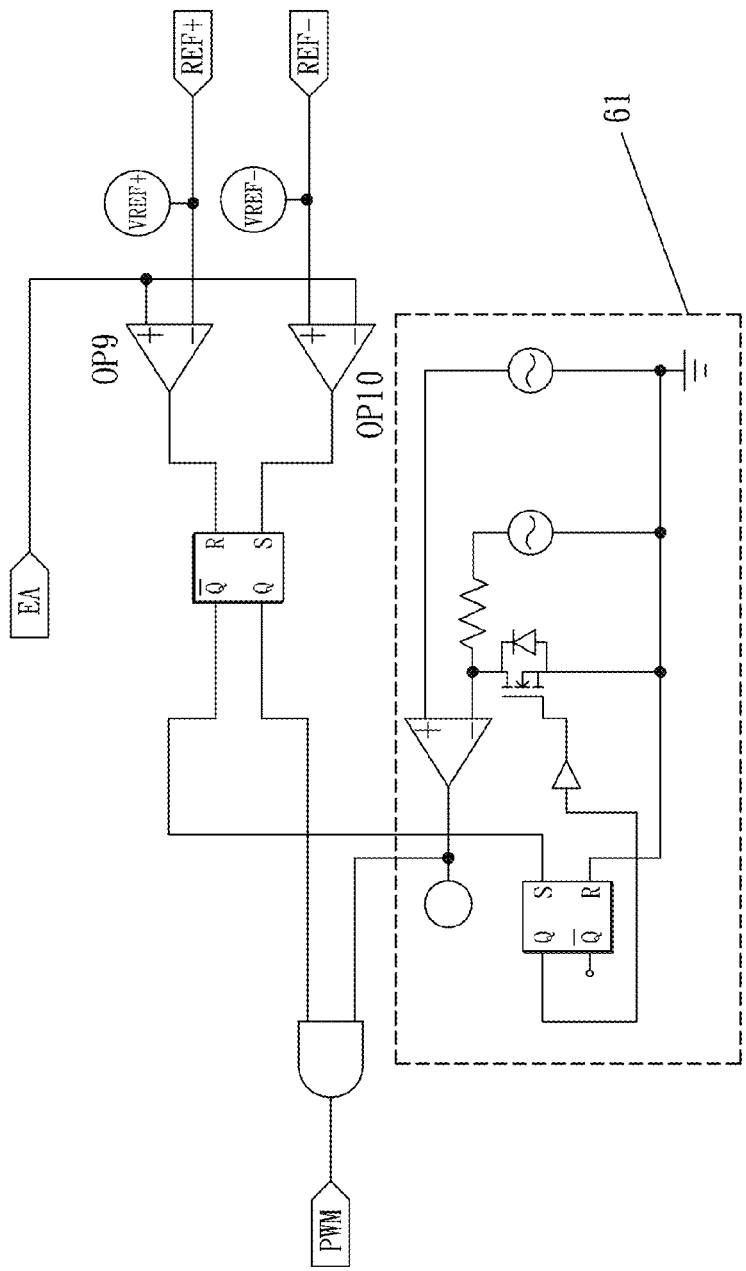
FIG. 9 shows the circuit for PWM generator.
Figure 10:
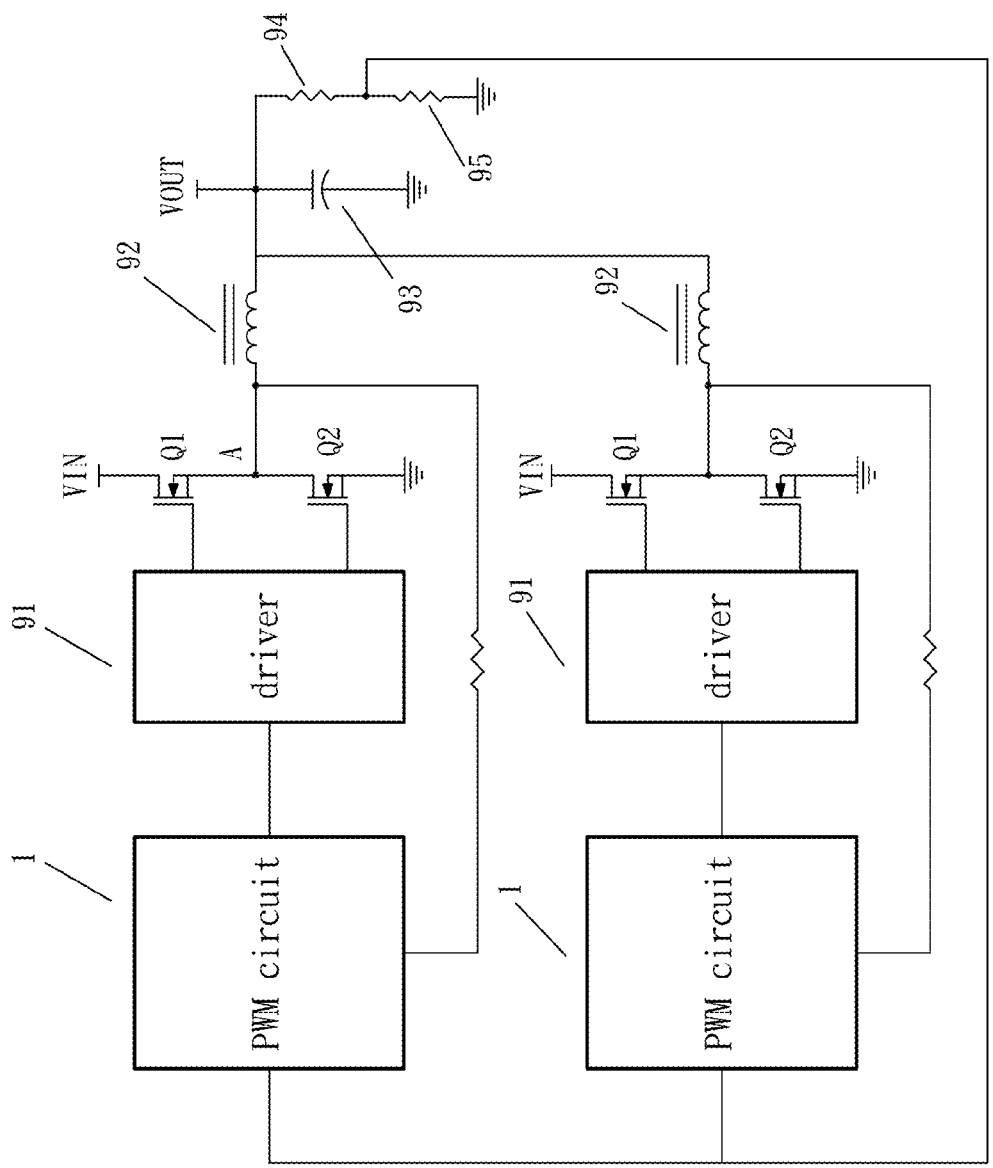
FIG. 10 shows different applications of the invention.

The invention claimed is:

1. A pulse-width modulation (PWM) control circuit of a converter, comprising:
one or more upper-bridge element, connected to one or more lower-bridge element by nodes; an input voltage being electrically connected with the upper-bridge element and the lower-bridge element; the node being activated by a driver controlled by a PWM signal for switching the upper-bridge element and the lower-bridge element "ON" and "OFF"; the node being connected with an output inductor and output capacitor, controlling current of the output inductor in charging the output capacitor for generating an output voltage, wherein the PWM control circuit includes a virtual ripple current PWM circuit, further includes an integrator-plus-DC bias voltage eliminator, a phase synthesizer, and a dual reference voltage generator; the input of the integrator-plus-DC bias voltage eliminator includes the voltage at the node and an output voltage response, and the output includes a virtual ripple signal parameter at a DC reference voltage level; the virtual ripple signal parameter is synthesized by the phase synthesizer using vector analysis with slopes of the output voltage for being a PWM signal parameter; the dual reference voltage generator generates an upper and a lower DC reference voltage level, and a comparison being made between the PWM parameter signal and the upper and the lower DC reference voltage level to generate a PWM signal input to the driver to control the upper-bridge and the lower-bridge element.

2. The pulse-width modulation (PWM) control circuit of a converter as claimed in claim 1, wherein the virtual ripple current PWM circuit includes a DC reference voltage level unit, and a PWM generator, the DC reference voltage level unit provides a reference DC voltage level, an input of the integrator-plus-DC bias voltage eliminator connects to the voltage at the node, and the DC reference voltage level unit, a square waveform of the voltage at the node being output as a triangular waveform at a DC reference level, with a slope of which corresponding to change of the voltage; the output of an integrated waveform voltage from the integrator-plus-DC Bias eliminator is input to the phase synthesis unit, superimposed proportionally by output voltage for being a triangular wave as a PWM signal parameter; an input of the dual reference voltage level generator connected to the DC reference voltage level unit, and the output of the dual reference voltage level generator connected to a PWM generator; the PWM generator generating a positive voltage and a negative voltage, both of the same voltage amount corresponding to the reference DC voltage level; an input of the PWM generator connected to an output of the phase synthesizer and an output of the dual reference voltage level generator; PWM signal is generated by comparing the signal parameter as well as the positive voltage and the negative voltage for generating a PWM signal.

3. The pulse-width modulation (PWM) control circuit of a converter as claimed in claim 2, wherein the integrator-plus-DC Bias eliminator includes an integrator and a DC Bias eliminator; the integrator integrates the square waveform of the voltage at the node to a triangular waveform; the DC bias eliminator includes an integral circuit and an error amplifier; the input of the integral circuit connects to an output of the integrator, while the error amplifier connects to the output of integral circuit as well as to an output node of the DC reference voltage level unit; a triangular wave of a different DC level is generated by the integrator.

4. The pulse-width modulation (PWM) control circuit of a converter as claimed in claim 2, wherein a integral-plus-DC Bias eliminator includes an integrator and a DC Bias eliminator; the integrator integrates a square waveform of the voltage at the node to a triangular waveform; the DC bias eliminator includes a comparator circuit and an integrator circuit; an input of the comparator circuit connects to an output of the integrator and an output of the DC reference level unit, an input of the integrator connects to the comparator circuit and the output of the DC reference level unit, the integrated waveform received by the integrator is based on DC reference level, after being compared by the comparator circuit to the DC reference level voltage, DC error being input to the integrator to generate a triangular waveform corresponding to the DC reference voltage level.

5. The pulse-width modulation (PWM) control circuit of a converter as claimed in claim 2, wherein the phase synthesizer includes an error amplifier, the input of which connects to feedback voltage of the integrator-plus-DC Bias eliminator and the converter, superimposed to be a PWM signal parameter for output.

6. The pulse-width modulation (PWM) control circuit of a converter as claimed in claim 2, wherein the dual reference voltage level includes two comparator circuits, an input of each of the two comparator circuits connects a DC reference level signal; each of the two connectors connects to a resistor; a higher and a lower DC current reference level corresponding, respectively, to the positive and negative DC reference level is generated, based on the resistance of the resistor connected.

7. The pulse-width modulation (PWM) control circuit of a converter as claimed in claim 2, wherein the PWM generator includes two comparator circuits, an input of one comparator circuit connects a PWM parameter signal and an upper DC reference level, while an input of the other comparator circuit connects to PWM parameter signal and a lower DC reference level; the two comparator circuits output a square waveform, in reaction to changes of slopes of the PWM parameter signal.

8. The pulse-width modulation (PWM) control circuit of a converter as claimed in claim 2, including the virtual ripple current PWM circuit, the driver, and a circuit connecting an upper-bridge element and a lower-bridge element, parallelly connected, further connected to the output inductor and the output capacitor.

9. A control method for a PWM control circuit of a converter, including one or more upper-bridge element, connected to one or more lower-bridge element by nodes; an input voltage being electrically connected with the upper-bridge element and the lower-bridge element; the node being activated by a driver controlled by a PWM signal for switching the upper-bridge element and the lower-bridge element "ON" and "OFF"; the node being connected with an output inductor and output capacitor, controlling current of the output inductor in charging the output capacitor for generating an output voltage, comprising the following steps:
 a) setting up a DC reference voltage level, the square waveform at the node being integrated at the integrator-plus-DC Bias eliminator becomes a virtual ripple current signal parameter at the DC reference voltage level;
 b) the virtual ripple current signal parameter being superimposed or synthesized with the output voltage response to become a semi-triangular PWM signal parameter; and
 c) monitoring the PWM signal parameter for generating a PWM signal to control the upperbridge and the lower-bridge element.

10. A control method for a PWM control circuit of a converter, as claimed in claim 9, wherein step c) refers to setting up an upper and a lower DC reference voltage level; and a rising and dipping of the PWM signal being located, respectively, upon the upper and lower reference voltage level.

* * * * *